(12) United States Patent
Kim et al.

(10) Patent No.: US 7,142,544 B2
(45) Date of Patent: Nov. 28, 2006

(54) ATM-PON ONU CONTROLLING APPARATUS

(75) Inventors: Chan Kim, Taejon (KR); Seung-Hwan Kim, Taejon (KR); Tae-Whan Yoo, Taejon (KR); Jong-Hyun Lee, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 834 days.

(21) Appl. No.: 09/852,304

(22) Filed: May 10, 2001

(65) Prior Publication Data

US 2004/0202174 A1    Oct. 14, 2004

(30) Foreign Application Priority Data

Dec. 26, 2000    (KR) .............................. 2000-82250

(51) Int. Cl.
    *H04L 12/56*    (2006.01)
(52) U.S. Cl. .............................. 370/395.1; 370/395.51; 370/465
(58) Field of Classification Search ............. 370/395.1, 370/395.51, 465, 466; 398/66–69, 71–72
See application file for complete search history.

(56) References Cited

U.S. PATENT DOCUMENTS

| | | | |
|---|---|---|---|
| 5,926,478 A | 7/1999 | Ghaibeh et al. | |
| 6,023,467 A | 2/2000 | Abdelhamid et al. | |
| 6,128,278 A | 10/2000 | Joffe et al. | |
| 6,411,410 B1* | 6/2002 | Wright et al. | .................. 398/79 |
| 6,614,759 B1* | 9/2003 | Lee et al. | ................. 370/236.2 |
| 6,633,541 B1* | 10/2003 | Hijikata et al. | ............. 370/231 |
| 6,636,527 B1* | 10/2003 | Lee et al. | .................... 370/465 |
| 6,647,210 B1* | 11/2003 | Toyoda et al. | ............... 398/102 |
| 6,665,315 B1* | 12/2003 | Karasawa | .................... 370/508 |
| 6,721,504 B1* | 4/2004 | Kim et al. | ..................... 398/58 |
| 6,728,248 B1* | 4/2004 | Uchida et al. | ........... 370/395.1 |
| 6,778,557 B1* | 8/2004 | Yuki et al. | ................... 370/468 |
| 2002/0057697 A1* | 5/2002 | Yamamori et al. | ....... 370/395.2 |
| 2002/0085583 A1* | 7/2002 | Kasa et al. | ................. 370/449 |

OTHER PUBLICATIONS

Tajima et al.; *Asymmetric ATM-PON interface compliant to ITU-T/FSAN Standard for global optical access systems*; Fujitsu Laboratories Ltd., Fujitsu Kyushu Digital Technology, Ltd.; pp. 27-30.

* cited by examiner

*Primary Examiner*—Chau Nguyen
*Assistant Examiner*—Rhonda Murphy
(74) *Attorney, Agent, or Firm*—Mayer, Brown, Rowe & Maw LLP

(57) ABSTRACT

A PON slave controller for use in a PON ONU system capable of processing in unit of byte outputs an enable signal to external for a mini-slot payload and receives a byte input signal for enabling usage of an arbitrary MAC (Medium Access Control) technique loading arbitrary data in a mini-slot. An ATM-PON ONU controlling apparatus of the present invention includes a cell receiving unit for transferring an ATM cell through a receiving UTOPIA interfacing unit to external and transferring a message in a PLOAM cell, a cell transmitting unit for loading the ATM cell received through a transmitting UTOPIA interfacing unit in a granted slot and transferring in upstream and downstream by loading the message being on standby in payload of the PLOAM cell when the PLAOM cell is transmitted, and a message processing unit for setting internal signals by processing the received message or instructing operation of a plurality of functional blocks, and transferring the message requested by the plurality of functional blocks through the cell transmitting unit.

8 Claims, 6 Drawing Sheets

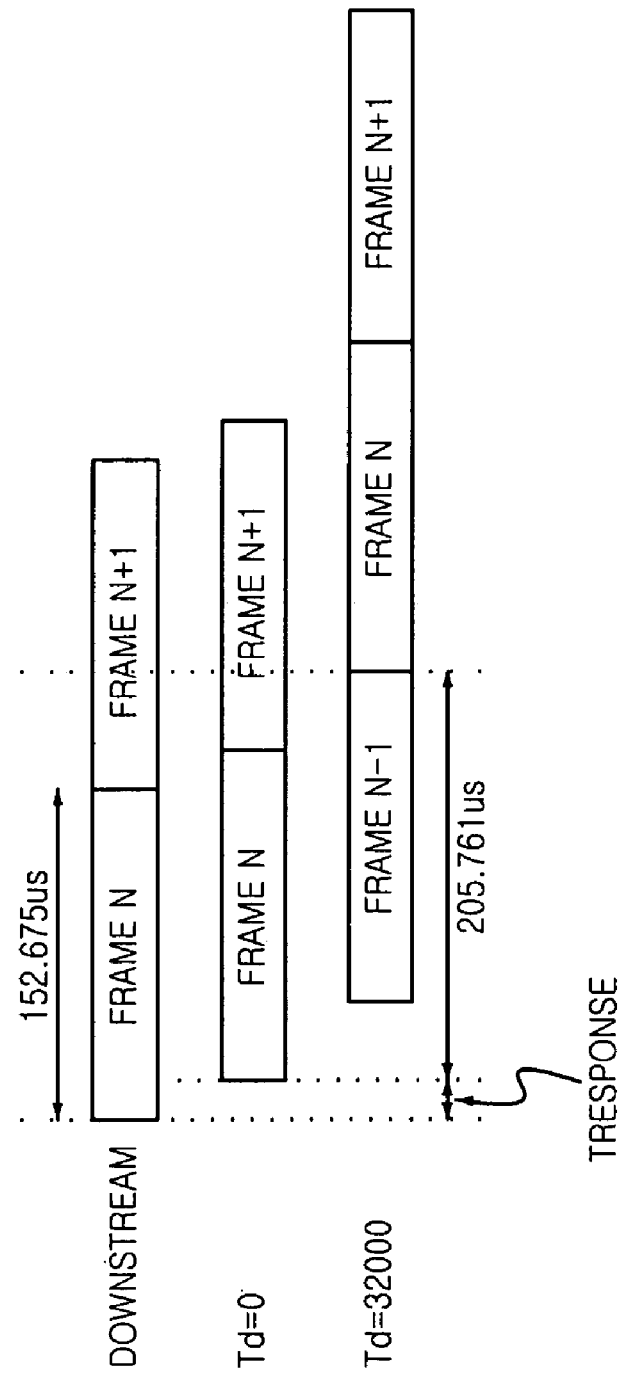

ATM-PON ONU CONTROLLING APPARATUS

FIELD OF THE INVENTION

The present invention relates to an ATM-PON ONU controlling apparatus; and more particularly, a PON (Passive Optical Network) slave controller for use in an PON ONU (Optical Network Unit) system for processing in unit of 1 byte 8 bits is constructed so that an enable signal for mini-slot payload is outputted to external and a byte input signal is received and arbitrary data can be loaded in the mini-slot to use an arbitrary MAC (Medium Access Control) technique.

DESCRIPTION OF THE PRIOR ART

There have been a number of inventions related to PON frame structure, transfer scheme of upstream usage request information, transfer scheme of downstream usage grant information and MAC (Medium Access Control) scheme.

Referring to recommendation G.983-1 of ITU-T (Telecommunication part of International Telecommunication Union), there are defined flexible fiber subscriber access network capable of accommodating bandwidth requirement for an ISDN (Integrated Service Digital Network) and B-ISDN (Broad bandwidth ISDN) services. This recommendation defines a symmetric system of 155 Mbps upstream/downstream and an asymmetric system of 622.080 Mbps downstream and 155 Mbps upstream. This recommendation defines physical layer requirement and specifications of medium access layer, transport convergence layer and ranging protocol in the ATM-PON.

FIG. 1 shows a diagram for illustrating structure of an access network of a PON technique in a conventional ATM exchange system.

As shown in FIG. 1, the access network comprises an OLT, a plurality of ONUs and optical fibers connected in PON format by using passive splitters. One optical fiber is connected to a number of ONUs by branching passively and, for this reason, TDMA (Time Division Multiple Access) protocol for sharing upstream bandwidth and the ranging protocol for enduring difference among the optical fibers and processing time delays are adopted. And also, special functions for privacy and security are arranged.

On the other hand, OLT and ONU controller chips in the PON take charges of TC (Transaction Capabilities) layer function for which FIGS. 2A and 2B show frame formats of the PON system having 622 Mbps downstream and 155 Mbps upstream. The downstream frame has 4×56 53-byte cells and a PLOAM (Physical Layer Operation And Maintenance) cell is inserted at every 28 cells. The format, header error control, cell delineation identification, distributed sample scrambler and operation and format of idle cell and the PLOAM cell are described in the recommendation. The downstream PLAOM cell has several control information, grant information for upstream slot usage and CRC (Cyclic Redundancy Check) in its payload. And it also has message, protected by the CRC, to be transferred to a particular ONU or all the ONUs and BIP (Bit Interleaved Parity) for performance monitoring. The grant value refers that each upstream slot is used for which type of cell, e.g., data, PLOAM, ranging cell or the like by which ONU.

The upstream frame has 53 56-byte ATM cells and overhead of 3 bytes. Cell delineation is performed by TDM (Time Division Multiplex) and the cells send from each of the ONUs are adjusted not to overlay at the OLT by ranging (distance measurement) procedure. The upstream cells are scrambled and an idle cell and a PLOAM cell are defined. The upstream PLOAM cell has several control fields, message protected by CRC, LCF (Laser Control Field), RXCF (Receiver Control Field) and BIP.

And the OLT and ONU have OAM procedure for failure and performance monitoring and the OLT monitors information such as LOS (loss of signal), LCD (loss of cell delineation), cell phase error, OAM synchronization loss and deactivation for each ONU. Each of the ONU monitors synchronization information for the cell, the PLOAM and the frame.

In order to prevent data from overhearing or eavesdropping by other ONUs due to the inherent downstream broadcasting characteristic, churning is performed by the master by using different churning key for each ONU and the churning key is generated by each slave and sent the master. The churning key is changed periodically and synchronization scheme for changing the churning key between the master and the slave is used.

A variety of messages are defined for ranging, churning and OAM and their detailed description is in the ITU-T G.983-1.

Because the upstream optical line is shared by several slaves and length of lines could be different from each other by thousands of bits in the PON system, ranging is important and the master of the OLT assigns different delay to each of the ONUs so that all the ONUs seem as located at same distance.

By ranging procedure, time delay components in paths to all of ONUs are absorbed so as to have same total delay. The ranging procedure can be started whenever one ONU is turned on and makes an access to the PON or started by a request of an operator. And, arrival phase of the cell for the ONU already connected is monitored periodically and amended. The delay time to/from each ONU is obtained by measuring time from sending ranging grant value to receiving its responding ranging cell. The ranging procedure includes assigning overhead, PON ID(identification) and grant value to be used by each ONU, of the upstream cell, measuring time delay and assigning a delay value required to make the time delay to each ONU same to the corresponding ONU. Receiving the time delay Td, each ONU goes to an operation state.

As described above, most of proceeding techniques for the PON relate to frame configuration required for construction of the PON and grant assigning method, i.e., the MAC method, which are described in detail as follows.

Firstly, relating to the MAC method, there is U.S. Pat. No. 5,926,478 titled as "Data transmission over a point-to-multipoint optical network" and issued in Jul. 20, 1999.

The patent of Erricson discloses structures of the downstream and upstream frames and MAC channel. However, in most of cases, bandwidth usage request information transferred in upstream related to the MAC is very closely related to an ATM-layer processing ASIC (Application Specific IC) disposed at upper part of the PON controller in system configuration. Therefore, if ATM control circuits for service quality control or buffer control is not integrated as a PON slave control circuit, desired MAC cannot be used. Accordingly, the bandwidth usage request transferred in upstream by the ONU in the PON system is transferred by mini-slots (mini-slots sent from several ONUs are timely multiplexed during one cell period as short cells) and the present invention introduces a technique for constructing a PON ONU controller, i.e., a PON slave controller and interface skill of the PON slave chip for transferring arbitrary information in the mini-slot.

Therefore, there is a demand for a technique using the arbitrary MAC method to load arbitrary data in the mini-slot by outputting an enable signal for the mini-slot payload and receiving a byte input signal by constructing the PON slave controller for use in the PON ONU system capable of processing in unit of 8-bit byte.

SUMMARY OF THE INVENTION

Therefore, it is an object of the present invention to provide an ATM (Asynchronous Transfer Mode)-PON (Passive Optical Network) ONU (Optical Network Unit) controlling apparatus for outputting an enable signal to external for a mini-slot payload and receiving a byte input signal and for enabling usage of an arbitrary MAC (Medium Access Control) technique loading arbitrary data in a mini-slot by constructing a PON slave controller for use in a PON ONU system capable of processing in unit of byte.

In accordance with an aspect of the present invention, there is provided an ATM-PON ONU controlling apparatus comprising a cell receiving unit for transferring an ATM cell through a receiving UTOPIA interfacing unit to external and transferring a message in a PLOAM cell to a message processing unit, a cell transmitting unit for loading the ATM cell received through a transmitting UTOPIA interfacing unit in a granted slot and transferring in upstream and downstream by loading the message waiting at the message processing unit in payload of the PLOAM cell when the PLAOM cell is transmitted, and the message processing unit for setting internal signals by processing the received message or instructing operation of a plurality of functional blocks, and transferring the message requested by the plurality of functional blocks through the cell transmitting unit.

The present invention is characterized in that the cell transmitting unit can use an arbitrary MAC technique by enabling arbitrary data loaded in a mini-slot by outputting an enable signal for mini-slot payload and receiving a byte input signal.

Also, The present invention is characterized in that the cell receiving unit, in order to transfer the arbitrary MAC data in upstream, by reflecting difference information between the arbitrarily obtained byte clock by the transceiver and actual aligned byte phase to transmitting timing when an external transceiver generates the byte stream and byte clock by gathering 8 bits for down data, reflects the byte delineation information to upstream frame time delay so that the round-trip delay has a constant value regardless of byte clock phase change at transceiver synchronization without time delay value change resulted from ranging.

BRIEF DESCRIPTION OF THE DRAWINGS

The above and other objects and features of the instant invention will become apparent from the following description of one embodiment taken in conjunction with the accompanying drawings, in which:

FIG. 3 presents phase relation between upstream and downstream frames shown at an ONU in accordance with the present invention;

DETAILED DESCRIPTION OF THE PREFERRED EMBODIMENTS

Hereinafter, one embodiment of the present invention and measurement results will be described in detail with reference to the accompanying drawings.

Since a PON slave chip of the present invention is basically frame processing circuit, it is convenient to use a counter at center of its controlling part for generating timing information.

For this purpose, FIG. 3 presents phase relation between upstream and downstream frames seen at an ONU in accordance with the present invention, in which the downstream frame consists of 56 53-byte cells and can use 56×53 counters. However, 56 counters are not sufficient to delineate a upstream frame away from a downstream grant more than one frame. Therefore, 2-bit counter should be disposed so as to delineate adjacent frames(1-bit counter can also be sufficient). Accordingly, the downstream counters should have 2×56×53 structure. And, because the upstream frame consists of 53 56-byte slots, it has 2×53×56 counters.

On the other hand, when ranging time message is received, the slave chip establishes phase delay by adjusting transmit timing by adding received time delay to typical phase difference and making the upstream counters start with additional delay of assigned value. During measurement of time delay, the ranging cell is transferred as similarly as a general cell so that processing delay time is included in the ranging.

Because a unit of a delay value Td finally received during the ranging given by the OLT (Optical Line Termination) is in upstream bit clock, it is not capable of inducing delay with a bit unit at an ASIC (Application Specific Integrated Circuit) executing byte processing. Therefore, delay of the byte unit, i.e., delay corresponding to other than lower 0~7 bits should be induced within the chip and delay of the remaining 0~7 bit, i.e., delay corresponding to lower 3 bit should be induced at a PCB (Printed Circuit Board) out of the chip. Selectively, delay corresponding to transmit data can be induced within a byte stream. However, at least a laser drive enable signal of an external burst mode laser diode should be controlled in unit of bit externally. And it is possible to match a Tresponse value required in the recommend by inducing a programmable initial delay.

Figure 1:
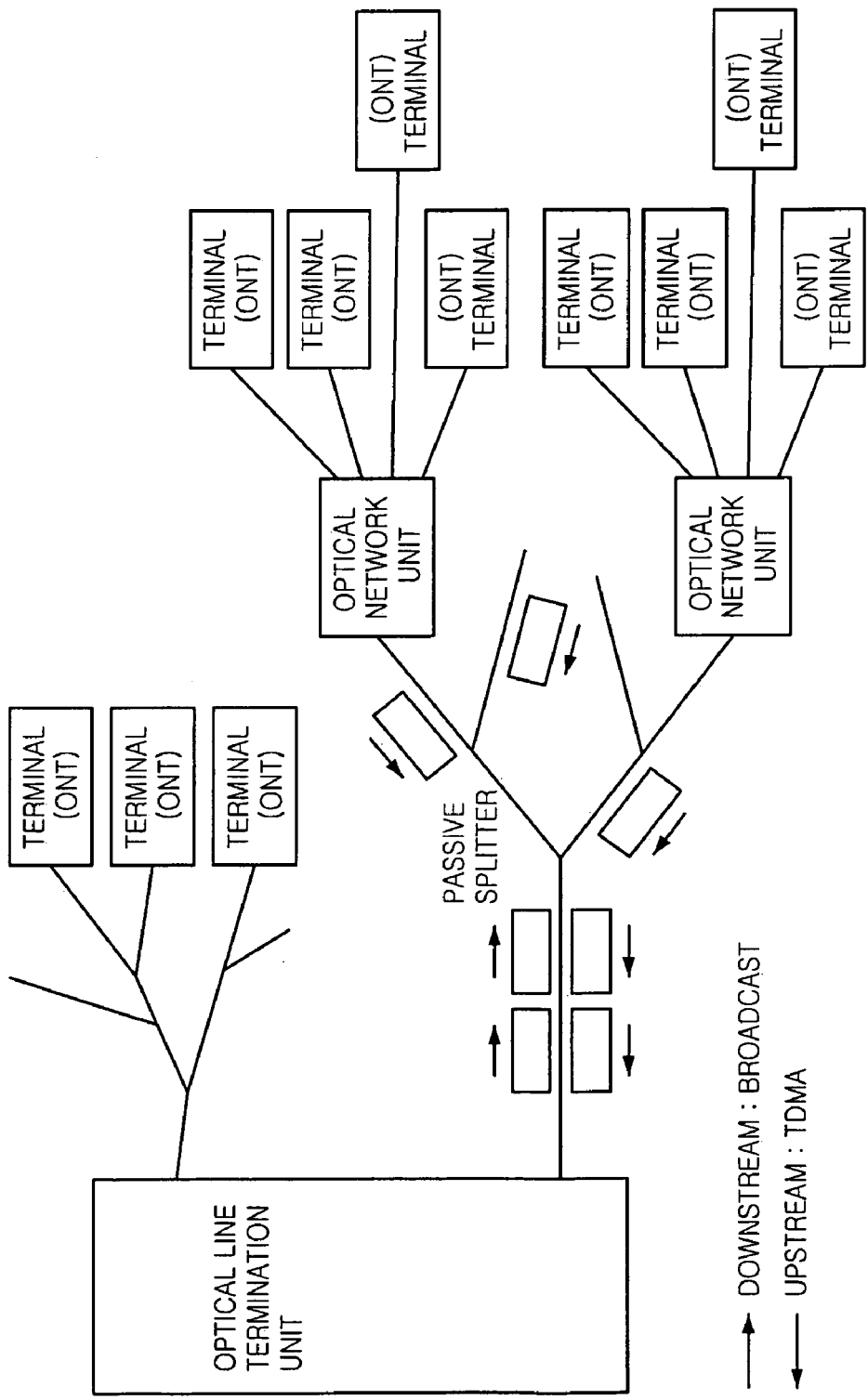
FIG. 1 shows a diagram for illustrating structure of an access network using PON technique with ATM exchange system.
Figure 2A:
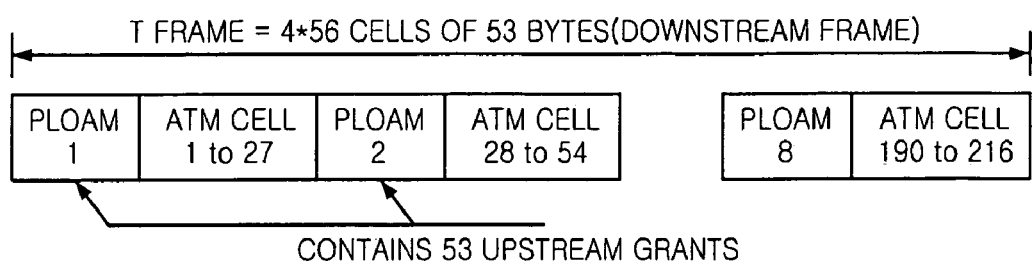
FIGS. 2A and 2B show frame formats of a PON system having 622.08 Mbps downstream and 155.52 Mbps upstream.
Figure 2B:
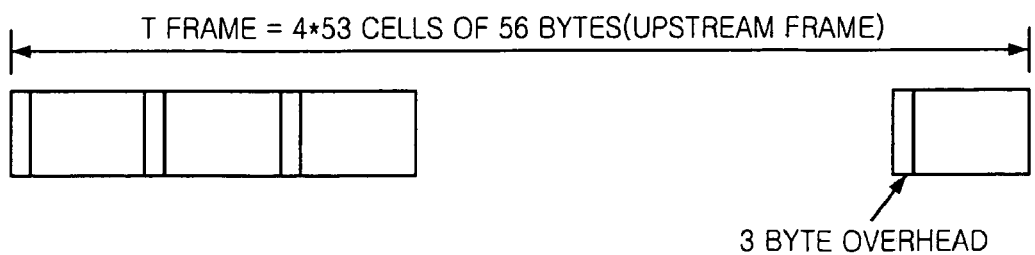
Figure 4:
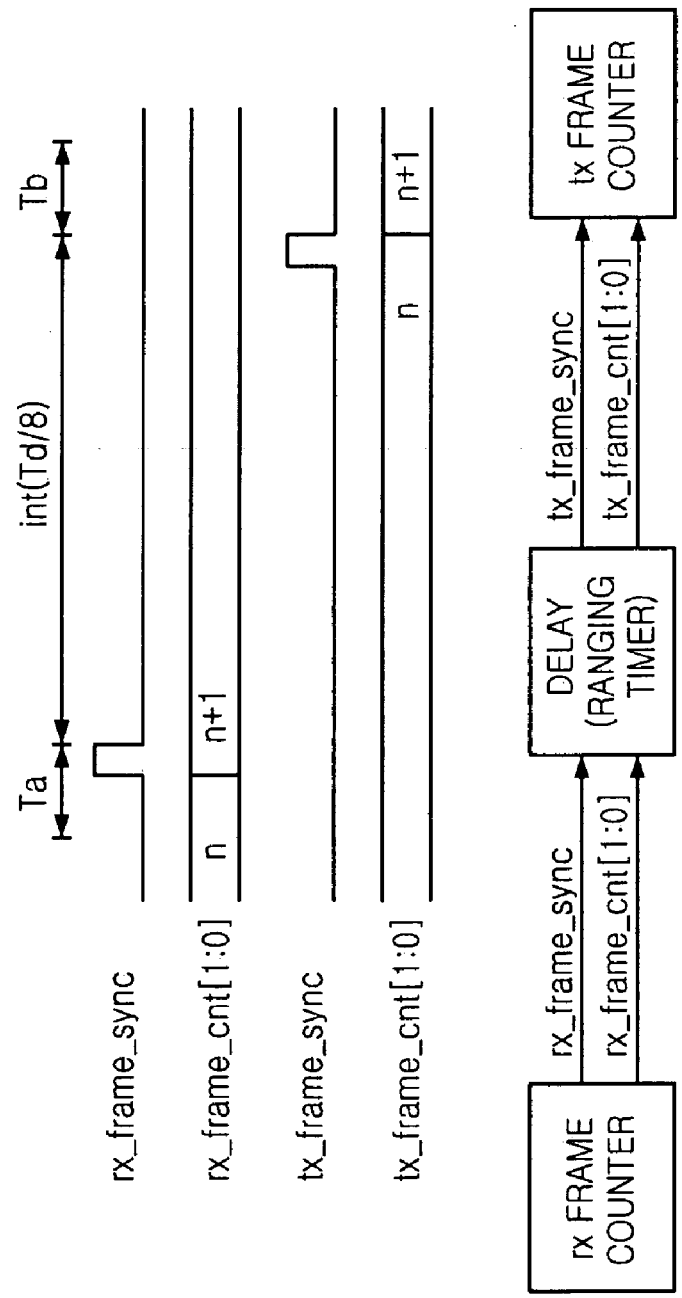
FIG. 4 provides a diagram for explaining a upstream frame counter synchronization circuit taking into account ranging time delay in accordance with the present invention.

FIG. 4 provides a diagram for explaining a upstream frame counter synchronization circuit taking into account ranging time delay in accordance with the present invention.

As shown in FIG. 4, a RX (receiving unit) frame counter and a TX (transmitting unit) frame counter in the PON slave chip have a frame count value for counting frame itself from 0 to 3 cyclically in addition to a slot counter and a byte counter. A RX frame synch pulse is generated at every other frame and a TX frame synch pulse for starting TX frame counting is generated by delaying the RX frame synch pulse by programmable amount.

At this time, since the frame count value 0~3 corresponding to the RX frame synch pulse is duplicated to the TX frame counter, delay between a RX frame and a TX frame has an arbitrary value beyond one frame. Therefore, a grant value received at a downstream slot can be used for corresponding upstream slot.

For this purpose, a downstream processing unit compares the received grant value with its assigned value and records comparison result at a grant table (by recording only the result for a decoded grant, the number of gates can be reduced). Since a 2-bit frame count value is used together with the slot count as an address in reading or writing table, a upstream processing circuit uses this 2-bit frame counter and the slot counter simultaneously so that it can read corresponding slot always after the ranging.

The decoded grant can be summarized as following 5 values.

data grant of oneself
PLOAM (Physical Layer Operation And Maintenance) of oneself
Mini-slot grant of oneself (or divided slot grant)
Ranging grant
Disabling grant (Reserved, Unassigned On the other hand, when CRC error occurs, corresponding 6 or 7 grant values are invalidated. When a slot decoding circuit of the transmitting unit meets a slot that should be used by it, a start pulse is generated corresponding to a data cell, PLOAM cell or mini-slot, on which all processing depend.

And also, a state machine is included and operated as defined in the recommendation G.983.1, which transits at every event and manages operation of the whole PON slave chip. For example, data cell transmitting is executed only at operation state O8 and serial number ONU message loading in the PLOAM cell and transmitting the PLOAM cell is executed when the PLOAM grant is received at a state O7. Most of events relate to synch state change and message receiving.

Figure 5:
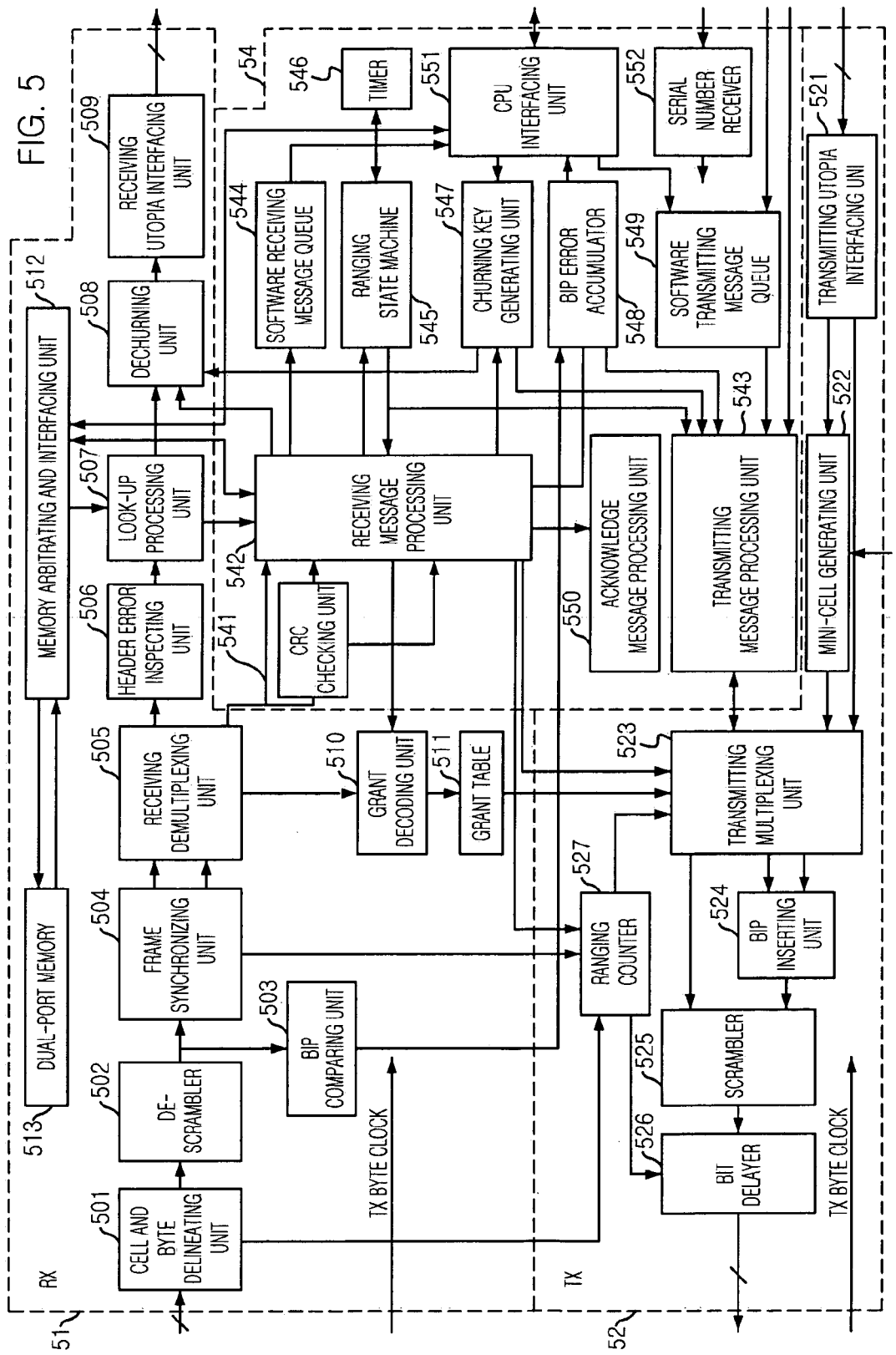
FIG. 5 shows one embodiment of an ATM PON ONU controlling apparatus in accordance with the present invention.

FIG. 5 shows one embodiment of an ATM-PON ONU controlling apparatus in accordance with the present invention.

As shown in FIG. 5, the ATM-PON ONU controlling apparatus of the present invention comprises a receiving unit 51 for receiving data from external, transferring the ATM cell to the external through UTOPIA interface and transferring the message in the PLOAM cell to a message processing unit 54, a transmitting unit 52 for receiving the ATM cell from external through the UTOPIA interface and transmitting it, loading the message on a granted slot and, when the PLOAM cell is to be transmitted, transmitting waiting message to the message processing unit 54, and a message processing unit 54 for setting internal signals, instructing operation of a number of functional blocks and, when the message is requested to be transmitted via the transmitting unit 52, processing the message received through the receiving unit 51 in response to the request.

The receiving unit 51 includes a cell and byte delineating unit 501 for receiving byte stream from an external serial/parallel transformer and delineating the cell and the byte, a descrambler 502 for receiving scrambled cell stream from the cell and byte delineating unit 501 and descrambling data by synchronizing internal pseudo random binary sequence to the received data, BIP (Bit Interleaved Parity) comparing unit 503 for computing a BIP value for the data received from the descrambler 502 for a period instructed by a frame synchronizing unit and comparing it with the received BIP value, the frame synchronizing unit 504 for synchronizing the frame by finding a location of the PLOAM cell and a frame starting point for the data received from the descrambler 502, a receiving demultiplexing unit 505 for demultiplexing the ATM cell and the message of the PLOAM cell and the received grant value from the data transferred from the frame synchronizing unit 504, a header error inspecting unit 506 for inspecting header error for the ATM cell transferred from the receiving demultiplexing unit 505 to correct the error or abandon the cell, a look-up processing unit 507 for reading the table depending on a VPI (Virtual Path Identifier) to check whether it is to be received or dechurned, a dechurning unit 508 for receiving ATM related information from the look-up processing unit 507 and, if necessary, dechurning the payload of the received ATM cell and changing a churning key, a receiving UTOPIA interfacing unit 509 for storing the ATM cell transferred from the dechurning unit 508 and transferring the stored ATM cell in response to an external request, a grant decoding unit 510 for decoding the grant value received from the receiving demultiplexing unit 505, a grant table 511 for receiving and storing the decoded grant values according to the writing signal from the grant decoding unit 510, a memory arbitrating and interfacing unit 512 for arbitrating connection table reading and writing requests from the message receiving processing unit 542 for processing the received message and a CPU (Central Processing Unit) interface 551 to process reading and writing, and a dual-port memory 513 being a memory having internal 4 K entries for storing information for VPI receiving and dechurning by using 12-bit VPI address.

The transmitting unit 52 includes a transmitting UTOPIA interfacing unit 521 for storing the ATM cell depending on an external request and transferring the ATM cell depending on a request of a transmitting multiplexing unit 523, a mini-cell generating unit 522 for generating payload of the mini-cell by using buffer information of the transmitting UTOPIA interfacing unit 521 or data from the external interface, the transmitting multiplexing unit 523 for determining category of the cell transferred via a grant table of the receiving unit 51 by the frame count and the slot counter of internal, transmitting an enable signal to a transmitting message processing unit 543, the mini-cell generating unit 522 or the transmitting UTOPIA interfacing unit 521, and generating slot data including transmitting overhead by multiplexing resultant data, a BIP inserting unit 524 for computing a BIP value for all data except for the overhead and the mini-cell for data transferred from the transmitting multiplexing unit 523 as instructed by the transmitting multiplexing unit 523 and inserting the BIP value into last byte of the PLOAM cell, a scrambler 525 for scrambling all data except for the overhead as instructed by the transmitting multiplexing unit 523 or the BIP inserting unit 524, a bit delayer 526 for selectively delaying the transmitted data transferred through the scrambler 525, and a ranging counter 527 for counting pulses from the frame synchronizing unit 504 by the delay Td from the received message by delaying the pulses.

The message processing unit 54 includes a CRC checking unit 541 for checking the CRC for the message transferred from the receiving demultiplexing unit 505 to transfer the message to a receiving message processing unit 542, the receiving message processing unit 542 for decoding the message transferred from the receiving demultiplexing unit 505, setting each register depending on the message, and instructing operation of a software receiving message queue 544, a ranging state machine 545 and a churning key generating unit 547 with parameter transfer, a transmitting message processing unit 543 for receiving a message insertion instruction from the transmitting multiplexing unit 523 and generating a predetermined message depending on a message transmitting request from the ranging state machine unit 545, the churning key generating unit 547 and a BIP error accumulator 548 to transfer it to the transmitting multiplexing unit, a receiving software message queue 549 for receiving and storing a message, to be processed by a software, from the receiving message processing unit 542 and interrupting a CPU interfacing unit 551 with the number of the messages for the CPU to read the messages, the ranging state machine unit 545 for managing operation of the whole chip and executing ranging, a timer 546 for finding out a time out required for ranging, the churning key generating unit 547 for generating a new churning key depending on an instruction from the receiving message processing unit 542 to transfer the key to the dechurning unit 508 and requesting the new churning key message transmitting to the transmitting message processing unit 543, a BIP error accumulating unit 548 for accumulating the number of the BIP errors transferred from the BIP comparing unit 503 to notify it to a CPU interfacing unit 551 and transferring the accumulated error value to the transmitting message processing unit 543 periodically, the software transmitting message queue 549 for receiving a software message from the CPU Interfacing unit 551 to transfer it to the transmitting message processing unit 543, a acknowledge (response) message processing unit 550 for receiving an acknowledge message from the receiving message processing unit 542 to transfer it to the transmitting message processing unit 543, the CPU interfacing unit 551 for reading a message transferred via the memory arbitrating and interfacing unit 512, the software receiving message queue 544 and the BIP error accumulating unit 548 in a format that can be read by the CPU to transfer the read message to the churning key generating unit 547 and the software transmitting message queue 549, and a serial number receiver 552 for receiving a serial number of a corresponding ONU at the CPU interfacing unit 551 and an external or internal register.

It will be described in detail for operation of the ATM-PON ONU controlling apparatus of the present invention.

Firstly, it will be described for operation of the receiving unit 51. After the cell and byte delineating unit 501 divides data inputted from external into possible byte streams, it performs cell delineation for each stream and declares found cell delineation among them as a correct byte delineation. Also, the cell and byte delineating unit 501 has one of "HUNT", "PRESYNC" and "SYNC" states for each byte stream and the most significant 2 bits of a HEC (Header Error Correction) are excepted until the receiving descrambler 502 is synchronized.

Therefore, the cell and byte delineating unit 501 sends a cell synchronization signal and recovered cell data to the receiving descrambler 502. By transferring phase difference from the byte clock to the ranging counter 527 with searching the byte delineation, by reflecting this difference to transmitting timing even when an external transceiver generates the byte clock and the byte stream by gathering 8 bits regardless of the byte delineation, difference of the transceivers is overcome at every power-on and constant delay Td is given so as to enable the OLT to execute a particular protection switching method which relies on the preservation of Td for the same ONU. The Td is not necessarily constant at every power-on for a selected ONU, but it may have to be constant for the particular protection switching mechanism.

The receiving descrambler 502 that executes DSS (Distributed Sample Scrambling) synchronizes its PRBS value to the PRBS value of the downstream data by applying sample values extracted from the most significant 2 bits of the HEC to an internal PRBS generator. The receiving desrambler 502 has states of synchronization acquisition, verification and operation.

After receiving ATM cell flow and finding out the location of the periodic PLOAM cell, the frame synchronizing unit 504 inspects "IDENT" pattern of the PLOAM cell internal and finds out the starting point of the frame. This block outputs the byte stream along with the synchronization signal required during post processing.

The BIP comparing unit 503 compares the computed BIP with the BIP in the last byte of the PLOAM cell for every PLOAM and transfers the number of the errors to the BIP error accumulator 548. This accumulated value is transferred to the transmitting message processing unit 543 periodically, that is, with a period determined by a downstream BIP period message and loaded in the upstream message to be transferred to the OLT.

The receiving demultiplexing unit 505 extracts the data cell and the PLAOM cell from the received frame to transfer them to the header error inspecting unit 506 and the grant decoding unit 510 or message receiving unit 542.

The grant decoding unit 510 decodes the received grant value and writes it at the receiving grant table 511 to let the transmitting unit 52 use it.

The header error inspecting unit 506 inspects the header of the ATM cell to abandon errored cell and correct the single bit error.

The look-up processing unit 507 extracts the VPI value of the received ATM cell and read the table by using the VPI value as the address so as to determine whether the corresponding cell of the VPI is to be received or payload is to be dechurned.

The dual-port memory 513 is a memory that has 4 K internal entries and stores, by using the 12-bit VPI value as an address, information for whether or not each of the VPIs is received and whether or not the payload is dechurned. Not only the look-up processing unit 507 reads/writes the memory but also the receiving message processing unit 542 writes the memory (when receiving the churned VP message). Furthermore, since the CPU interfacing unit 551 accesses this memory, the memory arbitrating and interfacing unit 512 arbitrates memory read and write requests.

CPU read/write is indirectly executed by using especially arranged data and a particular trigger bit of an address register and a control register.

For the external CPU, flag should be checked to confirm whether the memory read/write is completed after read/write request.

The dechurning unit 508 dechurns the corresponding payload when churning is enabled for the received cell. When the receiving message processing unit 542 receives a churning key update message at every time, the dechurning unit 508 changes the key value when the internal frame counter becomes 0 while it is decreased at every frame, set to 48, 32 or 16 depending on the message counter of the message.

The receiving UTOPIA interfacing unit 509 stores the received cells at the internal buffer and transfers them to external based on an external request.

Next, it will be described for operation of the transmitting unit 52. The transmitting UTOPIA interfacing unit 521 stores the ATM cell received through an UTOPIA interface at an internal buffer and, when the enable signal is inputted from the transmitting multiplexing unit 523, reads data at the buffer and transfers it to the transmitting multiplexing unit 523. When there is no cell at the buffer, an idle cell is transferred.

The mini-cell generating unit 522 receives the payload through the mini-cell payload receiving interface from the external or transfers the payload information of the mini-cell to the transmitting multiplexing unit 523 by selecting buffer state of the transmitting UTOPIA interfacing unit 521.

The transmitting multiplexing unit 523 controls the whole transmitting unit and generates 53 pulses having 56 byte duration. The transmitting multiplexing unit 523 sends the enable signal to the transmitting UTOPIA interfacing unit 521 or the transmitting message processing unit 543 when data cell or message information is required based on read result for the grant table and generates the cell by multiplexing by selecting the data inputted in response to the enable signal.

The ranging cell should be transmitted when the ranging grant is received at state O5 or the PLOAM grant is received at state O7 and, because such a cell should be transmitted to the transmitting message processing unit 543, it is transferred together to generate a proper message. The transmitting multiplexing unit 523 generates a final cell by adding the overhead to the transferred data.

For example, for the data cell, the overhead and the ATM cell transferred from the transmitting UTOPIA interfacing unit 521 are selected subsequently to generate the slot data. For the PLOAM cell, the overhead, the PLOAM cell header, IDENT (it is named by ITU-T in that the value is identical for all cells) pattern, a message from the transmitting message processing unit 543 a LCF (Laser Control Field), and a RXCF (Receiver Control Field) are selected subsequently to generate the slot data.

The BIP inserting unit 524 computes the BIP value and inserts it in the last byte of every PLOAM cell, excepting the overhead and the mini-cell data in computation. The scrambler 525 scrambles all transmitting byte including the mini-cell except for overhead.

The ranging counter 527 delays the pulse from the frame synchronizing unit 504 by the delay Td from the receiving message processing unit 542. Since the circuit operates by the byte clock, the delay is given in unit of byte and the lower 3 bit of the Td value is transferred to the external. The transmitting data itself is delayed within the bit delayer 526.

Finally, it will be described for operation of the message processing unit 54. In the PON system, the message is transferred by the payload of the upstream/downstream PLOAM cell, which is identified a "PON_ID" value representing a message receiver in downstream or a message transmitter in upstream, a message ID and 10-byte message field.

The receiving message processing unit 542 receives the message from the receiving demultiplexing unit 505, sets the internal register based on the category of the message, transfers the parameter and instructs operation of other blocks, if necessary, and write the message at the software receiving message queue 544 if the message is to be processed by the software. The messages of about 20 categories are processed related to ranging, OAM, churning and ATM layer in downstream.

For example, when the churning key update message is transferred, the number of the frames left until change of the key is transferred to the dechurning unit 508 that has already the key to be changed.

Similarly, the churning key request message is received, the receiving message processing unit 542 notifies that to the churning key generating unit 547. The churning key generating unit 547 generates the new key value and transfers it to the dechurning unit 508 and, simultaneously, requests the transmitting message processing unit 543 to send the new churning key message three times. Subsequently, receiving the grant assignment message, the receiving message processing unit 542 sends the received grant value to the grant decoding unit 510.

Receiving the enable signal from the transmitting multiplexing unit 523, the transmitting message processing unit 543 determines the message to be transferred based on a message generating request signal asserted at that time. The CRC value is generated within the transmitting multiplexing unit 523. About 10 messages are transferred in upstream for ranging, OAM, churning and message acknowledge.

The message transmitting request signal waiting at the transmitting message processing unit 543 is serviced in priority and there is a counter, for the message to be transferred a number of times, decreased until final transfer. For equal priority, cyclic service is established.

Therefore, the message acknowledge message is serviced by storing the received message at its corresponding FIFO and asserting the corresponding message transmitting request. Also, because there are several priorities for the acknowledge message, FIFO is used for each acknowledge message.

Figure 6:
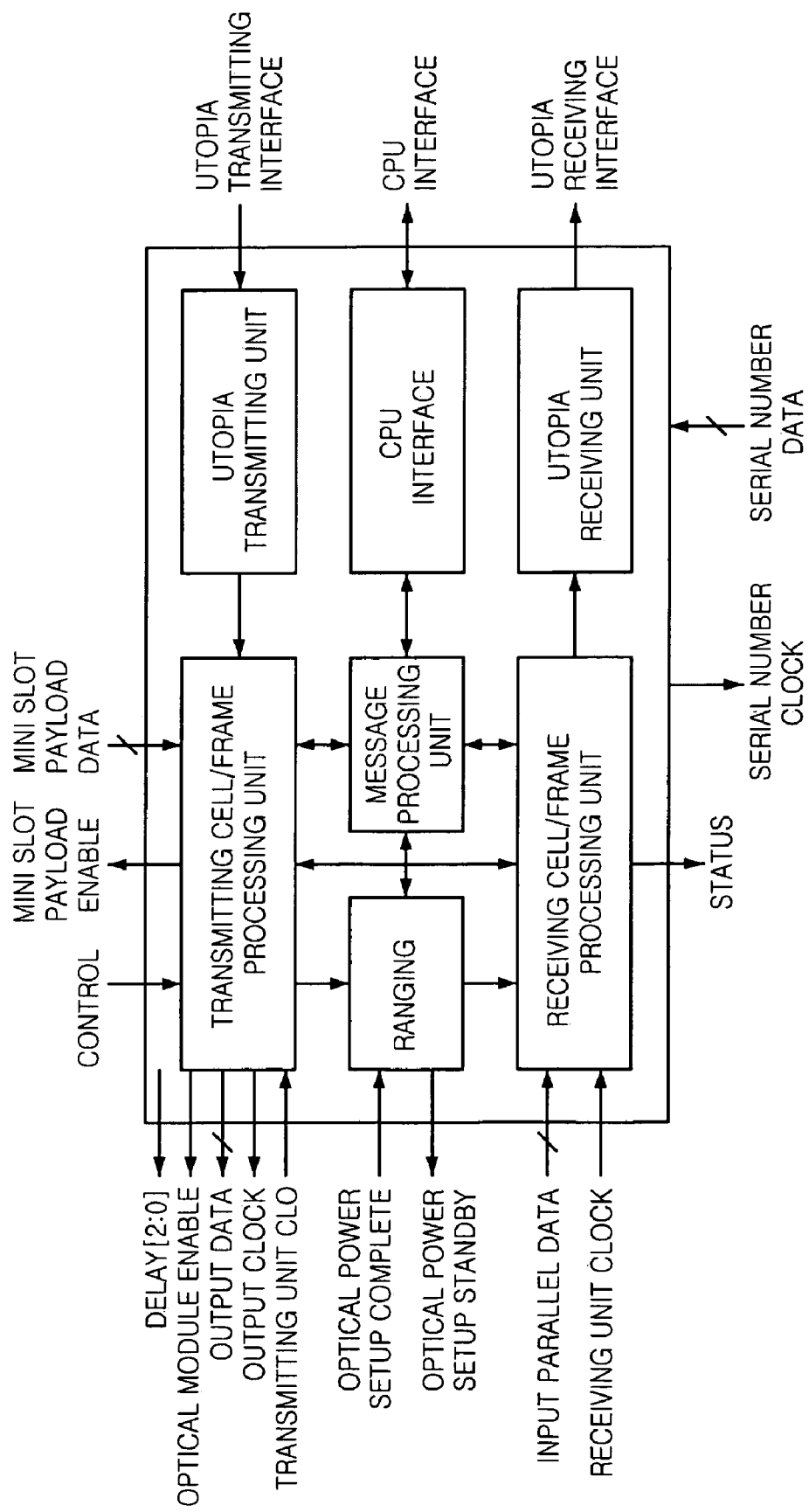
FIG. 6 offers a structure diagram of pin interface of the ATM PON ONU controlling apparatus in accordance with the present invention.

FIG. 6 offers a structure diagram of pin interface of the ATM PON ONU controlling apparatus in accordance with the present invention.

Firstly, because the transmitting unit and the receiving unit of the PON ONU controlling apparatus of the present invention are operated by the byte clock, it is impossible to give delay in unit of bit. Therefore, the delay of the upstream frame to the downstream frame is given within the chip and remaining bit delay for data is selectively given within the chip. In order to externally give the bit delay of 0~7 of a signal for turning on an external LD (laser diode), the bit delay value being lacking is encoded and outputted to external.

Next, the PON ONU controlling apparatus of the present invention has an interface for receiving the payload of the mini-slot to use desired MAC with a same PON slave chip. Before the ONU transfers the mini-slot, a mini-slot payload enable signal is outputted to external to input the payload data from a chip external circuit to the PON slave chip and to transfer to the mini-slot. The external circuit transfers request data in any form by using the enable signal.

As described above, in the present invention, a PON slave controller for use in an PON ONU system for processing in unit of 1 byte 8 bits is constructed so that an enable signal for mini-slot payload is outputted to external and a byte input signal is received and arbitrary data can be loaded in the mini-slot to use an arbitrary MAC (Medium Access Control) technique.

Also, in the present invention, because there is provided an interface for transmitting various mini-slot data and, even if a PON dedicated transceiver is not used in downstream, constant delay between the OLT and its corresponding ONU every time the power is newly turned on or when the transceiver is newly synchronized with new byte clock acquisition.

While the present invention has been shown and described with respect to the particular embodiments, it will be apparent to those skilled in the art that many changes and modifications may be made without departing from the spirit and scope of the invention as defined in the appended claims.

What is claimed is:

1. An ATM (Asynchronous Transfer Mode) PON (Passive Optical Network) ONU (Optical Network Unit) controlling apparatus, comprising:

a cell receiving means for receiving an ATM cell from the PON downstream data and transferring the ATM cell through a receiving UTOPIA interfacing means to an external device and transferring a message in a PLOAM (Physical Layer Operation and Maintenance) cell to a message processing means by demultiplexing;

a cell transmitting means for transmitting the ATM cell received through a transmitting UTOPIA interfacing means in a granted slot and transferring in upstream by loading the message being on standby in payload of the PLOAM cell when the PLOAM cell is transmitted; and the message processing means for setting internal signals by processing the received message or instructing operation of a plurality of functional blocks, and transferring the message requested by the plurality of functional blocks through the cell transmitting means;

wherein an external transceiver generates from received bit stream a recovered byte clock and associates received byte stream by blindly gathering every 8 bits to byte for downstream data regardless of correct byte boundaries, and a following byte delineation logic selects correct byte stream out of 8 possible bits shifted byte streams by monitoring a cell delineation result;

wherein the cell receiving means generates a pulse which indicates a start of a frame reference, and the pulse is delayed before setting a start point of counters governing an upstream frame timing, thus implementing desired amount of a relative phase difference between downstream frames and upstream frames;

wherein an initial pulse delay is done for an initial delay amount before conducting ranging, but after ranging, an amount of time delay received from an optical line termination (OLT) is added to the delay amount so that a round trip time for the ONU becomes equal to a pre-defined round trip time used for all ONUs; and wherein the amount of the pulse delay also reflects the difference of from 0 to 7 bits between the recovered byte clock and the selected correct byte stream phase, and of total delay which is in unit of bits, the amount which can be delayed in byte processing with byte clock is applied in byte processing logic and a remaining bit delay of from 0 to 7 bits is applied in the cell transmitting means by shifting the data bit-wise, and also the remaining bit delay information is outputted from the chip so that the laser enable signal can also be equivalently delayed with external bit processing logic to thereby remove the uncertainty of measured RTT value arising from the blindness of the byte clock recovery after power-up and makes the RTT value to appear to be the same every time the ONU system is powered up or byte clock is newly recovered with different random phase with respect to the correct byte boundaries.

2. The apparatus as recited in claim 1, wherein the cell transmitting means outputs an enable signal for minislot payload and receives mini-slot payload bytes and sends them upstream on the minislot for using an arbitrary mini-slot report format.

3. The apparatus as recited in claim 1, wherein the cell receiving means includes:

a cell and byte delineating means for receiving a byte stream from an external serial/parallel transformer and delineating the cell and the byte;

a descrambling means for receiving a scrambled cell stream from the cell and byte delineating means and descrambling data with synchronization to the received data; a BIP (Bit Interleaved Parity) comparing means for computing a BIP value for the data received from the descrambling means for a predetermined period and comparing the computed BIP value with the received BIP value;

a frame synchronizing means for synchronizing the frame by finding a location of the PLOAM cell and a frame starting point for the data received from the descrambling means;

a receiving demultiplexing means for demultiplexing the ATM cell, the PLOAM cell, and a grant value and a message received thereto from the data transferred from the frame synchronizing means;

a look-up processing means for reading the table depending on a VPI (Virtual Path Identifier) by using the ATM cell transferred from the receiving demultiplexing means to check whether it is to be received or dechurned;

a receiving UTOPIA interfacing means for storing the ATM cell transferred from the look-up processing means and transferring the stored ATM cell in response to an external request;

a grant decoding means for decoding the grant value received from the receiving demultiplexing means; and a grant table for receiving and storing a writing signal from the grant decoding means.

4. The apparatus as recited in claim 3, wherein the cell receiving means further includes:

a header error inspecting means for inspecting header error for the ATM cell transferred from the receiving demultiplexing means to correct the error or to abandon the cell;

a dechurning means for receiving ATM related information from the look-up processing means and, if necessary, dechurning the payload of the received ATM and changing a churning key;

a memory arbitrating and interfacing means for arbitrating connection table reading and writing requests from the message receiving processing means processing the received message from external and a CPU (Central Processing Unit) interface to process reading and writing, the content of the data written to or read from the memory being information on whether, for the given VPI value, to pass the received ATM cell to the receiving UTOPIA processing and whether to dechrun the received ATM cell; and a dual-port memory for storing information for VPI receiving and dechurning by using the VPI as an address.

5. The apparatus as recited in claim 1, wherein the cell transmitting means includes:

a transmitting UTOPIA interfacing means for storing the ATM cell depending on an external request and transferring the ATM cell;

a transmitting multiplexing means for determining category of the cell transferred via a grant table by the frame count and the slot counter of internal, transmitting an enable signal to a transmitting message processing means, a mini-cell generating means or the transmitting UTOPIA interfacing means, and generating slot data including transmitting overhead by multiplexing resultant data coming according to the enable signals;

a BIP inserting means for computing a BIP value for all data except for the overhead and the mini-cell for data transferred from the transmitting multiplexing means as instructed by the transmitting multiplexing means and inserting the BIP value into last byte of the PLOAM cell;

a scrambling means for scrambling all data except for the overhead as instructed by the transmitting multiplexing means or the BIP inserting means; and a ranging counting means for delaying the synchronization pulse coming from the receiver frame synchronizing means as many clocks as set by the delay Td which is delivered in the received message.

6. The apparatus as recited in claim 5, wherein the cell transmitting means further includes:

a mini-cell generating means for generating payload of the mini-cell by using buffer information of the transmitting UTOPIA interfacing means or data from the external interface; and a bit delaying means for selectively delaying the transmitted data transferred through the scrambling means using the value transferred from the ranging counting means.

7. The apparatus as recited in claim 1, wherein the message processing means includes:

a CRC (Cyclic Redundancy Check) checking means for checking the CRC for the message transferred from the receiving demultiplexing means to transfer the message;

a receiving message processing means for decoding the message transferred from the receiving demultiplexing means, setting each register depending on the message, and triggering other functional blocks;

a transmitting message processing means for receiving a message insertion instruction from the transmitting multiplexing means and generating a predetermined message depending on a message transmitting request from various blocks;

a ranging state machine for ranging by managing operation;

a timer for finding out a time out required for ranging; and a CPU interfacing means for reading a message transferred via the memory arbitrating and interfacing means in a format that can be read by the CPU.

8. The apparatus as recited in claim 7, the message processing means further includes:

a receiving message storing means for receiving and storing a message, to be processed by a software, from the receiving message processing means and interrupting a CPU interfacing means with the number of the messages for the CPU to read the messages;

a churning key generating means for generating a new churning key depending on an instruction from the receiving message processing means to transfer the key to the dechurning means and requesting the new churning key message transmitting to the transmitting message processing means;

a BIP error accumulating means for accumulating the number of the BIP errors transferred from the BIP comparing means to notify it to the CPU interfacing means and transferring the accumulated error value to the transmitting message processing means periodically;

a transmitting message storing means for receiving a message from the CPU interfacing means to transfer it to the transmitting message processing means;

a response message processing means for receiving an acknowledge message from the receiving message processing means to transfer it to the transmitting message processing means; and a serial number receiving means for receiving a serial number of a corresponding ONU from a register set by the CPU interfacing means or an external interface.

* * * * *